(12) United States Patent
Takemoto

(10) Patent No.: US 10,410,420 B2
(45) Date of Patent: Sep. 10, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/195,118

(22) Filed: Jun. 28, 2016

(65) Prior Publication Data

US 2017/0004653 A1    Jan. 5, 2017

(30) Foreign Application Priority Data

Jun. 30, 2015    (JP) .................................. 2015-132197

(51) Int. Cl.
    *G06T 19/00*    (2011.01)
    *G02B 27/01*    (2006.01)
    *G06T 17/05*    (2011.01)

(52) U.S. Cl.
    CPC .......... *G06T 19/006* (2013.01); *G02B 27/017* (2013.01); *G06T 17/05* (2013.01); *G06T 2200/04* (2013.01); *G06T 2210/21* (2013.01)

(58) Field of Classification Search
    CPC ... G06T 19/006; G06T 17/05; G06T 2200/04; G06T 2210/21; G02B 27/017
    See application file for complete search history.

(56) References Cited

U.S. PATENT DOCUMENTS 6,552,722 B1 *  4/2003  Shih ........................ G06F 3/016
                                                           345/419
2006/0256110 A1   11/2006  Okuno et al.
(Continued)

FOREIGN PATENT DOCUMENTS

CN    103472909 A    12/2013
CN    104641399 A    5/2015
(Continued)

OTHER PUBLICATIONS

Barnhill, et al., "A marching method for parametric surface/surface intersection", Computer Aided Geometric Design, 1990, pp. 257-280, vol. 7, No. 1-04, XP008023488.
(Continued)

*Primary Examiner* — Chong Wu
(74) *Attorney, Agent, or Firm* — Canon U.S.A., Inc. IP Division

(57) ABSTRACT

An apparatus includes an image acquisition unit configured to acquire a captured image of a real space, a position and orientation acquisition unit configured to acquire a position and orientation of each of a plurality of virtual objects, an interference determination unit configured to determine whether interference is present between the virtual objects based on the position and orientation of each of the plurality of virtual objects and model data of the plurality of virtual objects, an interference information recording unit configured to record an outline of an interference part where the virtual objects interfere with each other as interference information, based on a result of the interference determination unit, a generation unit configured to generate a composite image including the captured image, an image of the plurality of virtual objects, and an image representing the outline of the interference part.

15 Claims, 10 Drawing Sheets

(56) References Cited

U.S. PATENT DOCUMENTS

| | | | |
|---|---|---|---|
| 2008/0112646 A1* | 5/2008 | Kitaura | G06K 9/00697 |
| | | | 382/286 |
| 2008/0218515 A1 | 9/2008 | Fukushima et al. | |
| 2011/0077088 A1* | 3/2011 | Hayashi | A63F 13/218 |
| | | | 463/43 |
| 2012/0118947 A1* | 5/2012 | Lyons | G07F 17/3241 |
| | | | 235/375 |
| 2013/0113802 A1* | 5/2013 | Weersink | G06T 15/20 |
| | | | 345/427 |
| 2013/0182012 A1 | 7/2013 | Kim et al. | |
| 2014/0104274 A1* | 4/2014 | Hilliges | G06F 3/011 |
| | | | 345/424 |
| 2015/0282116 A1* | 10/2015 | Cho | H04W 64/006 |
| | | | 455/456.1 |

FOREIGN PATENT DOCUMENTS

| | | |
|---|---|---|
| JP | H10-201947 A | 8/1998 |
| JP | 2006-215750 A | 8/2006 |
| JP | 2006-302035 A | 11/2006 |
| JP | 2007-004713 A | 1/2007 |
| KR | 10-2014-0028096 A | 3/2014 |
| WO | 00/38117 A1 | 6/2000 |

OTHER PUBLICATIONS

Jayaram, et al., "A virtual assembly design environment", Proceedings IEEE Virtual Reality, Mar. 13, 1999, pp. 172-179,, XP055315372.

* cited by examiner

FIG. 8

| FRAME NUMBER | 123 FRAME |
|---|---|
| INTERFERENCE OBJECT | VIRTUAL OBJECT 201, VIRTUAL OBJECT 202 |
| TIME | 2015/05/26 10:37 |
| NUMBER OF VERTEXES | 536 |
| VERTEX POSITION | (3.56, 4.32, 1.53), (3.52, 4.15, 5.22), (3.52, 4.15, 5.22), (6.23, 1.33, 5.31), (6.23, 1.33, 5.31), (6.32, 1.15, 4.18), (6.32, 1.15, 4.18), (3.52, 4.15, 5.22), ... |
| COLOR | R: 233, G: 15, B: 15 |
| LINE WIDTH | 2 PIXELS |

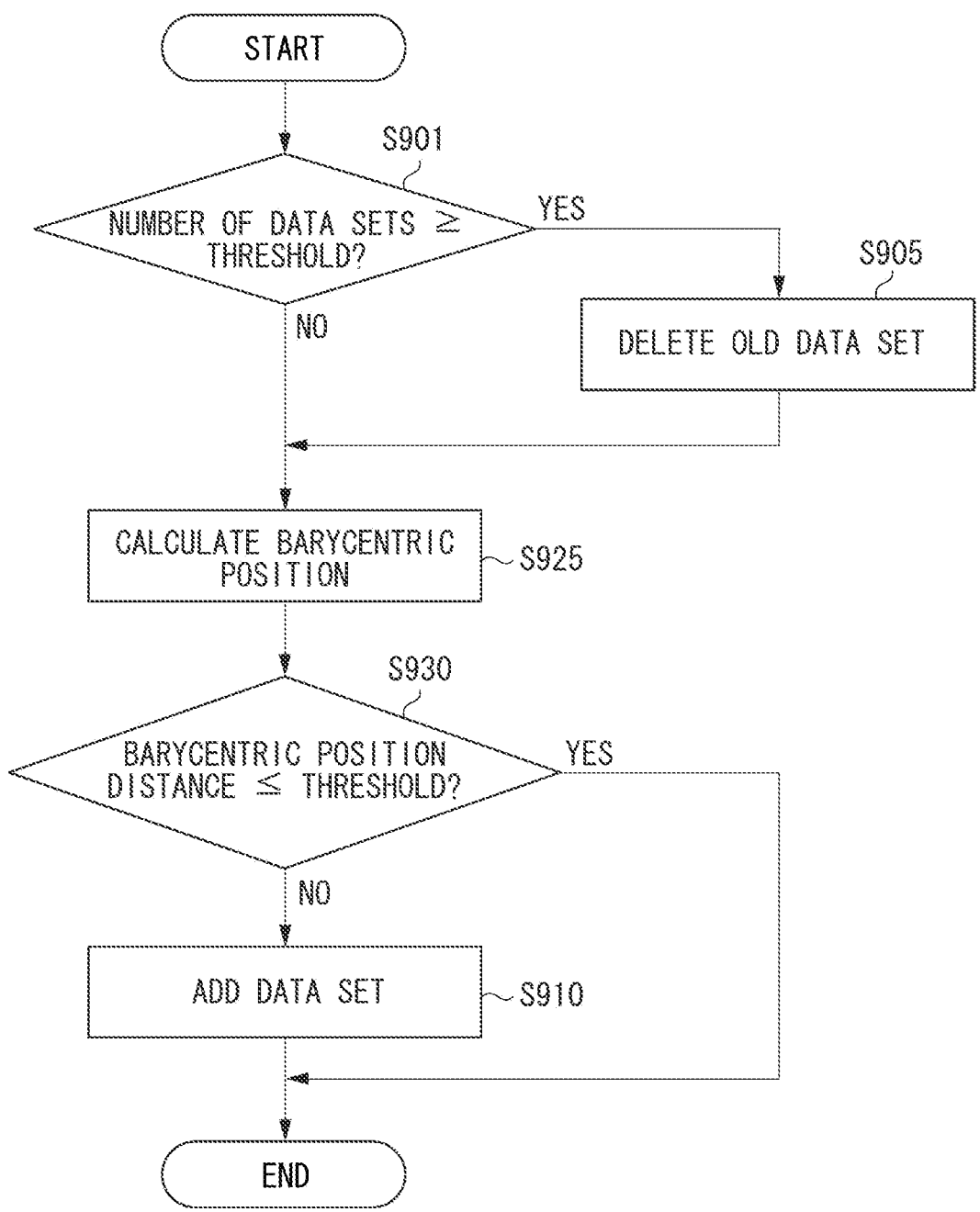

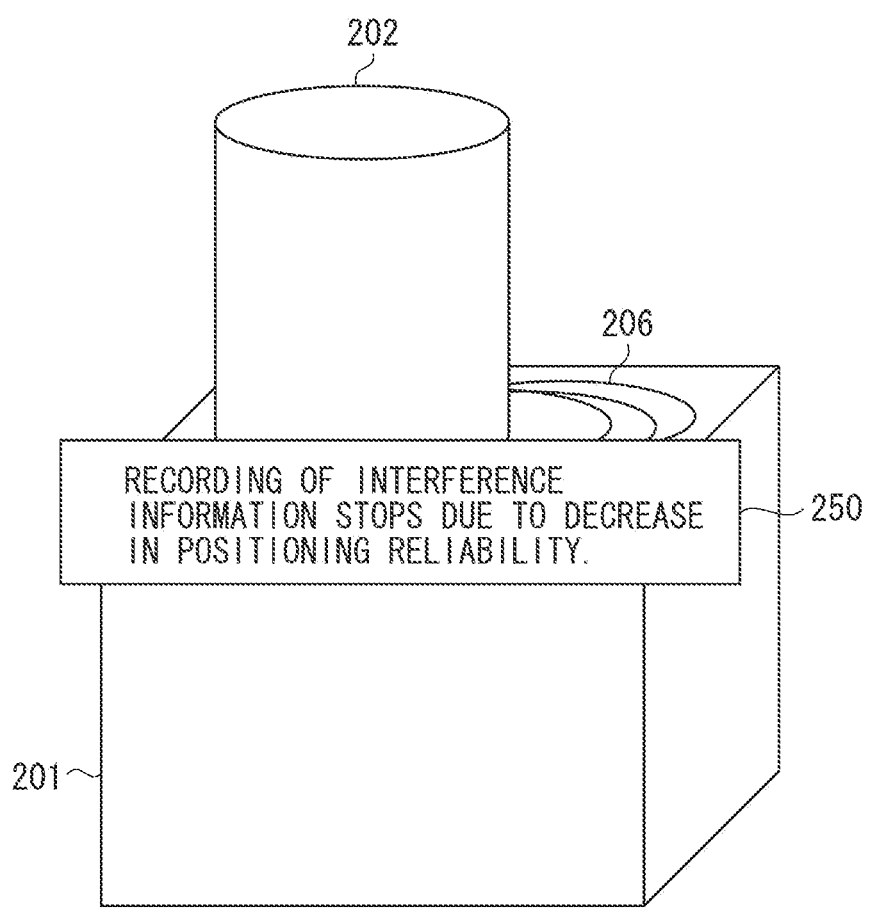

INFORMATION PROCESSING APPARATUS, INFORMATION PROCESSING METHOD, AND STORAGE MEDIUM

BACKGROUND OF THE INVENTION

Field of the Invention

The present invention relates to a mixed reality system.

Description of the Related Art

In recent years, reductions in a time period and costs for evaluation using a prototype have been expected in design and manufacturing fields. Meanwhile, a mixed reality (MR) system has been introduced. The MR system virtually evaluates easiness of assembly and maintainability by using layout (shape and design) data created by a computer aided design (CAD) system. A representative evaluation item is an item for evaluating whether a work can be performed without causing a tool to interfere with components other than a target component, based on only virtual components, even if real components are not present.

The MR system for performing such an evaluation is expected to have a function of presenting whether a virtual object (e.g., a tool) moved by an experiencing person has interfered with another virtual object (a component), or where and what type of interference trace has remained in the event of the interference.

Japanese Patent Application Laid-Open No. 2006-302035 discusses a method for recording a group of positions where interference has occurred into a memory, and displaying a trail by linking such groups of positions on the memory with a line segment in a time series manner.

However, in the method discussed in Japanese Patent Application Laid-Open No. 2006-302035, only sequential linking with the line segment is performed. Therefore, it is difficult to determine to what extent the interference trace has remained in the component.

SUMMARY OF THE INVENTION

According to an aspect of the present invention, an information processing apparatus includes an image acquisition unit configured to acquire a captured image of a real space, a storage unit configured to store model data of a plurality of virtual objects, a position and orientation acquisition unit configured to acquire a position and orientation of each of the plurality of virtual objects, an interference determination unit configured to determine whether interference is present between the virtual objects based on the position and orientation of each of the plurality of virtual objects and the model data of the plurality of virtual objects, an interference information recording unit configured to record an outline of an interference part where the virtual objects interfere with each other as interference information, based on a result of the interference determination unit, a first generation unit configured to generate a composite image including the captured image, an image of the plurality of virtual objects, and an image representing the outline of the interference part, and an output unit configured to output the generated composite image.

According to the present application, interference information indicating a shape of an interfering part can be presented with respect to interference between a virtual object and a target object.

Further features of the present invention will become apparent from the following description of exemplary embodiments with reference to the attached drawings.

BRIEF DESCRIPTION OF THE DRAWINGS

FIG. 8 is a table illustrating an example of a data set of interference information in the first exemplary embodiment.

FIG. 9 is a flowchart illustrating details of a process to be performed by an interference information holding unit in the first modification.

FIG. 10 is a schematic diagram illustrating a result of rendering an image of a virtual space in the second modification.

DESCRIPTION OF THE EMBODIMENTS

Exemplary embodiments to which the present invention is applied will be described in detail below with reference to the attached drawings.

Figure 7:
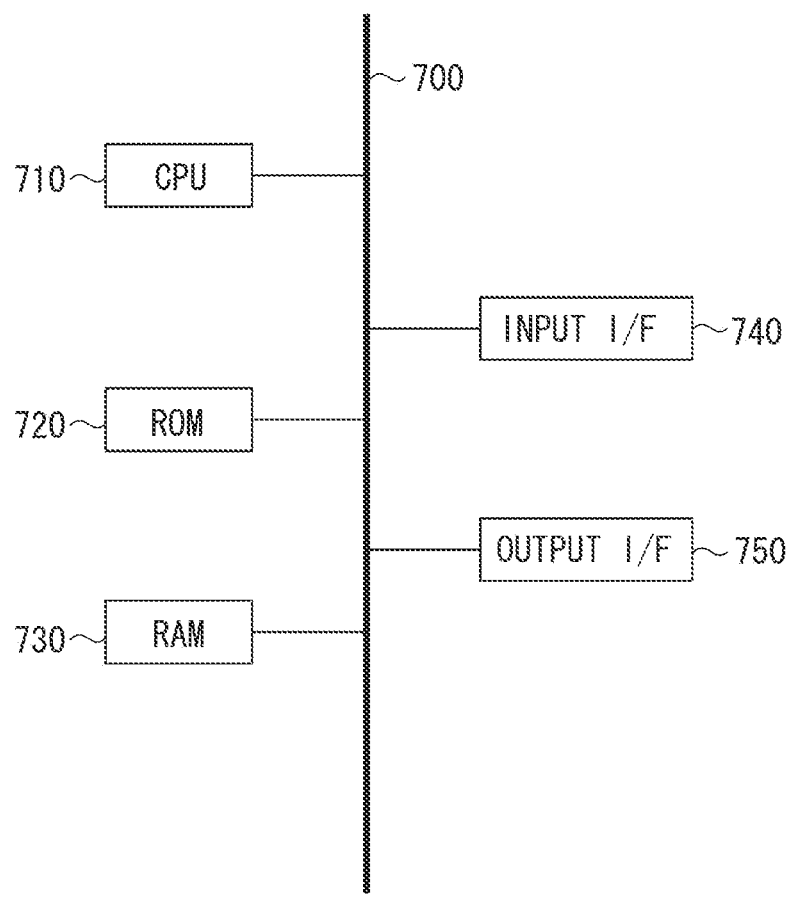
FIG. 7 is a diagram illustrating an example of a hardware configuration of the information processing apparatus in the first exemplary embodiment.

FIG. 7 is a block diagram illustrating hardware for implementing a first exemplary embodiment.

Specifically, FIG. 7 is a hardware block diagram of an information processing apparatus 100 (see FIG. 1) in the present exemplary embodiment. In FIG. 7, a central processing unit (CPU) 710 comprehensively controls each device connected via a bus 700. The CPU 710 reads out a processing step or a program stored in a read only memory (ROM) 720, and executes the read-out processing step or program. Including an operating system (OS), software such as each processing program and a device driver according to the present exemplary embodiment is stored in the ROM 720, and temporarily stored into a random access memory (RAM) 730 to be executed by the CPU 710 as appropriate. An input interface (I/F) 740 receives a signal from an external apparatus (such as an image capturing apparatus and an operation apparatus), and inputs the received signal as an input signal in a form processable by the information processing apparatus 100. An output I/F 750 outputs a signal as an output signal in a form processable by an external apparatus (e.g., a display apparatus such as a head mounted display (HMD)).

Figure 1:
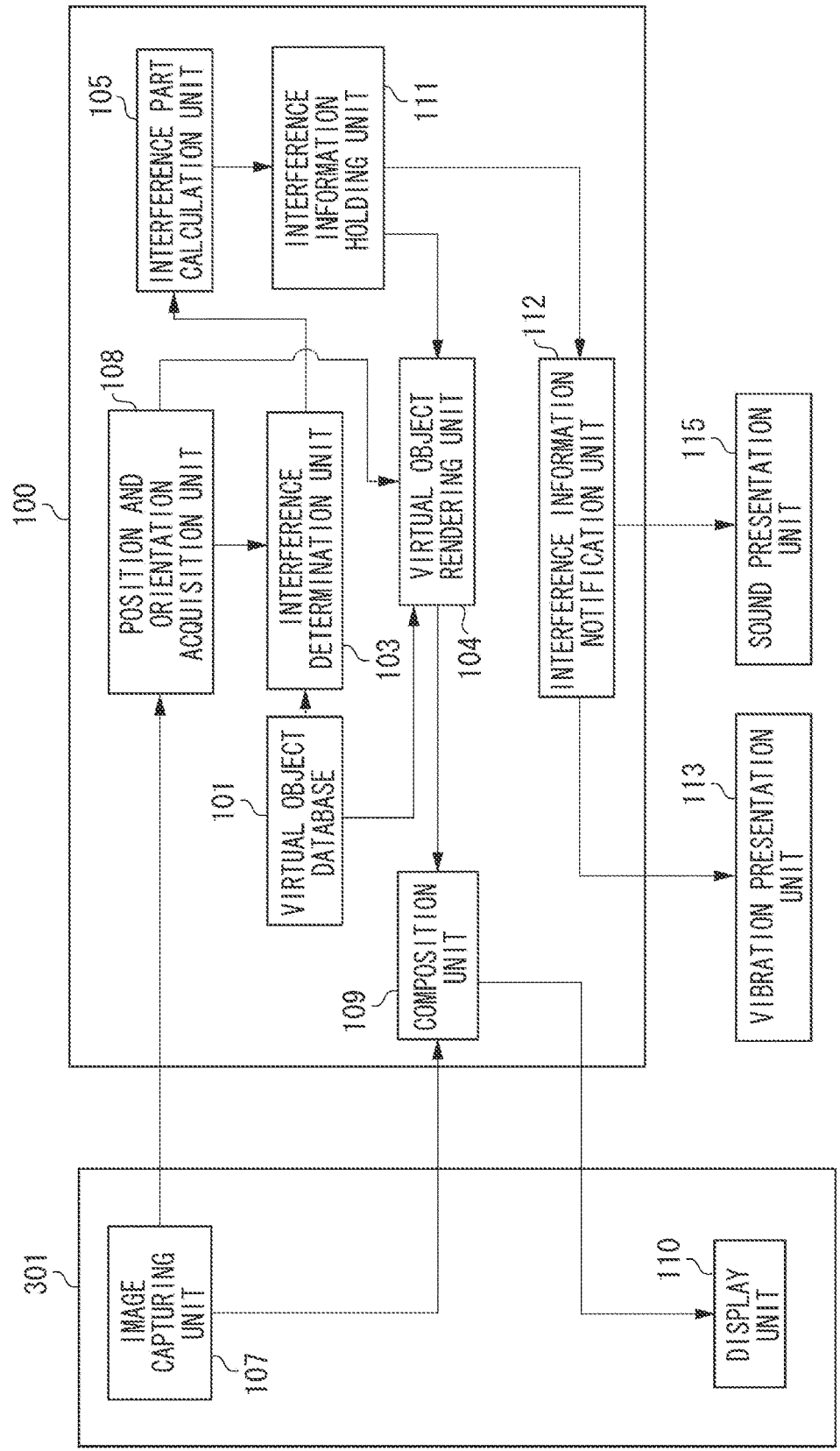
FIG. 1 is a block diagram illustrating a configuration of an information processing apparatus in a first exemplary embodiment.

FIG. 1 is a block diagram illustrating a functional configuration of the information processing apparatus 100 in the present exemplary embodiment.

The information processing apparatus 100 in the present exemplary embodiment is connected to an HMD 301. The information processing apparatus 100 combines an image of a real space acquired from an image capturing unit 107 in the HMD 301 with an image of a virtual space, and outputs a mixed reality image obtained thereby to a display unit 110 in the HMD 301.

The image capturing unit 107 captures an image of a real space, and provides the captured image to the information processing apparatus 100. The composition unit 109 combines the captured image with an image of a virtual object, and the display unit 110 displays a resultant composite image. In the present exemplary embodiment, the image capturing unit 107 is built in the HMD 301.

The display unit 110 presents the composite image rendered by the composition unit 109 to an experiencing person. In the present exemplary embodiment, a display built in the HMD 301 is used.

A vibration presentation unit 113 receives an output indicating occurrence of interference from an interference information notification unit 112. The vibration presentation unit 113 then presents vibration for notifying to a tactile sense of the experiencing person (user) that the interference has occurred. In the present exemplary embodiment, a device for rotating a motor having a leading end, to which an eccentric weight is attached, is used as the vibration presentation unit 113. This device is attached to a body part of the experiencing person. However, the present invention is not limited to this example, and any method may be used if the method stimulates the tactile sense. For example, a weak electric current may be applied to an electrode attached to a fingertip.

A sound presentation unit 115 receives, from the interference information notification unit 112, an output indicating occurrence of interference. The sound presentation unit 115 then presents to an auditory sense of the experiencing person sound for notifying that the interference has occurred. In the present exemplary embodiment, a speaker provided independently of the information processing apparatus 100 is used. For example, a headphone may be built in the HMD 301, and the sound may be presented using the headphone. Further, a stationary speaker may be used. Furthermore, a speaker may be built in the information processing apparatus 100. Any type of sound may be used if the sound can stimulate the auditory sense of the experiencing person. For example, a beep of a predetermined wavelength may be used.

The information processing apparatus 100 includes a virtual object database 101, an interference determination unit 103, a virtual object rendering unit 104, an interference part calculation unit 105, a position and orientation acquisition unit 108, the composition unit 109, an interference information holding unit 111, and the interference information notification unit 112.

The CPU 710 implements each of these functional units by reading a program stored in the ROM 720 into the RAM 730, and executing a process according to each of flowcharts to be described below based on the program. Further, for example, if hardware is configured as an alternative of a software process using the CPU 710, an arithmetic unit and a circuit corresponding to the process of each of the functional units described here may be configured.

Figure 2A:
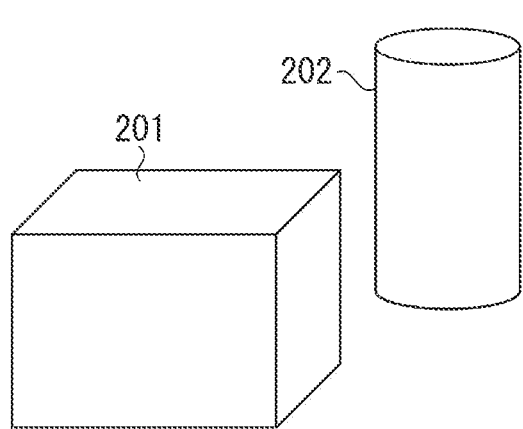
FIGS. 2A, 2B, and 2C are schematic diagrams illustrating virtual objects, a current interference part, and past interference parts, respectively, in the first exemplary embodiment.

The virtual object database 101 holds a model of a virtual object. The model of the virtual object includes, for example, a shape, a display color, and an initial position and orientation. In the present exemplary embodiment, two virtual objects 201 and 202 are each taken as an example. The virtual objects 201 and 202 have a rectangular parallelepiped shape and a column shape, respectively, as illustrated in FIG. 2A.

The position and orientation acquisition unit 108 acquires an image from the image capturing unit 107 (that is the position and orientation acquisition unit 108 has a function of an image acquisition unit) and estimates a position and orientation of the image capturing unit 107 (i.e., the position and orientation of the HMD 301) in the real space, and a position and orientation of the virtual object, based on an image acquired from the image capturing unit 107 (image acquisition). In the present exemplary embodiment, the position and orientation of the image capturing unit 107 is assumed to be a viewpoint position and orientation of the experiencing person. The position and orientation of the image capturing unit 107 is calculated based on an image in which a marker placed in the real space is imaged (image capturing unit position and orientation measurement). Further, as for the position and orientation of the virtual object, for example, an existing real object corresponding to the virtual object is placed in the real space beforehand. A marker is affixed to the existing real object, and a position and orientation of the real object is estimated based on the image in which the marker is imaged. The estimated position and orientation of the existing real object is estimated as the position and orientation of the virtual object corresponding to the real object. The experiencing person can change the position and orientation of the virtual object by moving the existing real object. However, in the present invention, a method for acquiring the viewpoint position and orientation of the experiencing person as well as the position and orientation of the virtual object is not limited to this example. For example, a three-dimensional sensor may be affixed to or built in the existing real object and used. Further, the position and orientation of the virtual object relative to the image capturing unit 107 can be measured using a commercial motion capture system. The virtual object may be displayed at a predetermined position and moved by using a device such as a controller, without providing the existing real object corresponding to the virtual object.

The interference determination unit 103 determines presence or absence of interference between a plurality of virtual objects based on a position and orientation as well as a shape of each of the virtual objects. Determination of interference between two virtual objects is implemented in the following procedure. One triangular polygon is extracted from each of the virtual objects, and whether the respective triangle polygons intersect each other is determined. Such determination is performed for every combination of triangle polygons. Even if there is only one intersection, the virtual objects are determined to be interfering with each other, when the intersection is present. Further, this process is performed for every combination of virtual objects. However, the way of implementing the interference determination unit 103 in the present exemplary embodiment is not limited to this example.

The interference part calculation unit 105 calculates an interference part from the virtual objects determined to be interfering with each other by the interference determination unit 103. In the present exemplary embodiment, a set of intersecting triangle polygons and a set of lines of intersection are calculated as the interference part (an outline of an interfering part). However, in the present exemplary embodiment, the way of representing the interference part is not limited to this example.

The interference information holding unit 111 holds interference information calculated by the interference part calculation unit 105 (interference information recording). FIG. 8 illustrates an example of the interference information.

An item "frame number" represents a number that is incremented by one each time an image captured by the image capturing unit 107 is updated.

An item "interference object" represents identification information of a model that identifies each interfering virtual object. In the present exemplary embodiment, a name of each virtual object is registered. An item "time" represents the time when occurrence of interference is actually determined.

An item "number of vertexes" is the number of end nodes of the lines of intersection of the polygons in the virtual objects 201 and 202 interfering with each other.

Figure 2B:
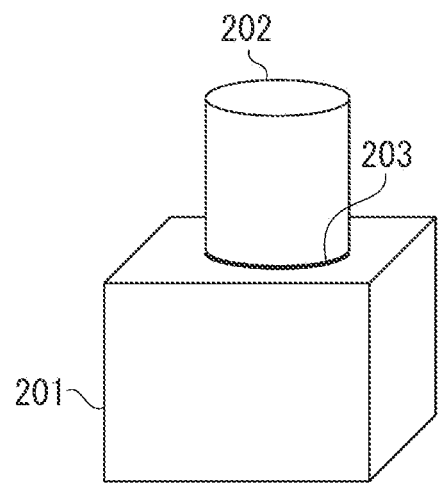

An item "vertex position" represents a three-dimensional position of every end node of the lines of intersection. When the vertex positions are rendered as a line segment, a circular line (an interference part 203 of the virtual objects 201 and 202) in FIG. 2B is obtained.

Items "color" and "line width" each represent a rendering attribute to be used when the interference information is rendered as an image of a virtual object. The color and the line width that are the rendering attributes are not limited to being generated in the event of interference, and parameters may be set beforehand.

The table illustrated in FIG. 8 represents a data set for each frame number, and a history of data sets is held. The present invention is not limited to segmenting the interference information into the data sets based on the frame number. The data set may be created using the time as a key. Further, the data set may be created for each combination of two virtual objects indicated as the interference object.

The virtual object rendering unit 104 generates an image in which the interference information as well as the virtual objects 201 and 202 are rendered. To be more specific, the virtual object rendering unit 104 generates an image based on the model data stored in the virtual object database 101 and the interference information stored in the interference information holding unit 111.

Figure 2C:
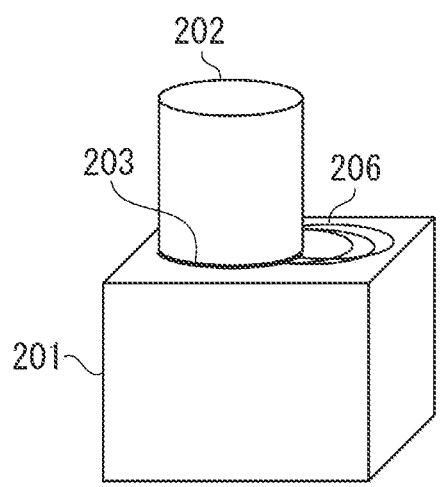

The virtual object rendering unit 104 acquires, from the position and orientation acquisition unit 108, a position and orientation of a virtual viewpoint for generating an image of a virtual space. As the position and orientation of the virtual viewpoint, for example, position and orientation information of the image capturing unit 107 in a world coordinate system used as a reference may be input. Further, three-dimensional vertex positions of the virtual objects 201 and 202 as well as the interference information are updated based on the position and orientation acquired by the position and orientation acquisition unit 108. The updated three-dimensional vertexes of the virtual objects and the interference information are projected onto a projection plane that is set based on the virtual viewpoint. A polygon and line segment rendering process after the projection is similar to an ordinary rendering process for generating a three-dimensional (3-D) image and thus will not be described in detail. FIG. 2C illustrates an image of the virtual space generated by the virtual object rendering unit 104 in the present exemplary embodiment. The virtual objects 201 and 202 as well as an interference part 206 based on the interference information accumulated so far are rendered (interference information image generation). In the present exemplary embodiment, the outline of the interference part 206 is rendered. Further, for example, a specific color may be superimposed on the inside of the outline, thereby making it easy to recognize the interference part 206.

The composition unit 109 combines the image of the real space acquired from the image capturing unit 107 with the image of the virtual space rendered by the virtual object rendering unit 104. This composition process is performed by rendering the image of the virtual space on the image of the real space acquired from the image capturing unit 107, thereby obtaining a composite image. In the composite image, pixels of the image of the real space are displayed as pixels in an area except for an area forming the virtual objects 201 and 202. The composition unit 109 outputs the composite image to an display unit 110 in the HMD 301.

The interference information notification unit 112 notifies another notification unit of the current interference state based on the information of the interference information holding unit 111. In the present exemplary embodiment, whether the interference exists is explicitly presented to the experiencing person by visually displaying the image generated by the virtual object rendering unit 104 based on the virtual objects 201 and 202 as well as the interference information. However, if a place where interfere occurs is outside a visual field of the image capturing unit 107, the experiencing person cannot perceive the interference based on the visual display alone. The experiencing person can perceive the interference occurring outside the visual field, if whether the interference exists is presented to the auditory sense and the tactile sense.

Figure 4:
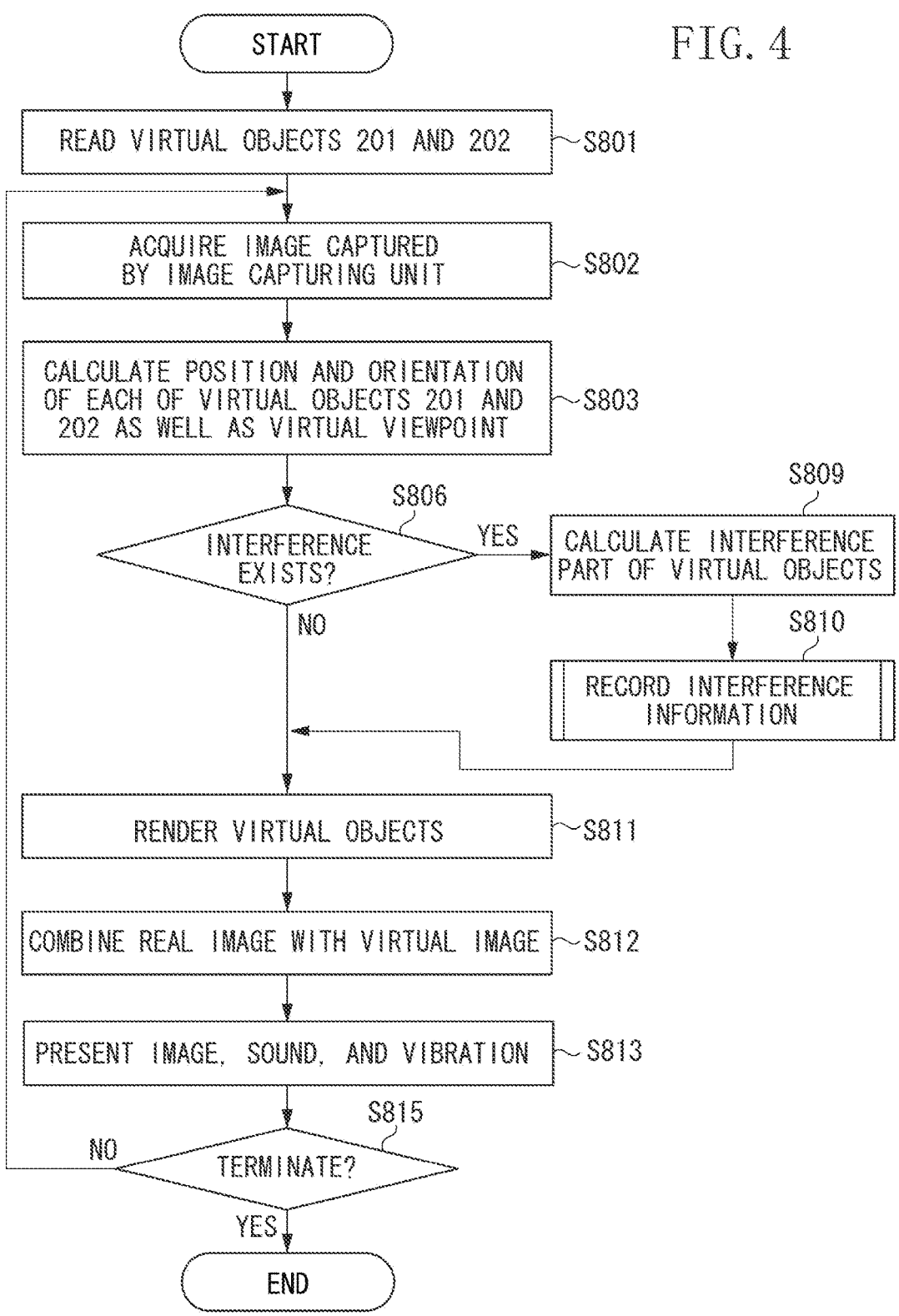
FIG. 4 is a flowchart illustrating details of a process to be performed by the information processing apparatus in the first exemplary embodiment.

FIGS. 2A, 2B, and 2C are schematic diagrams each illustrating an example of the image of the virtual space in the present exemplary embodiment. Further, FIG. 4 is a flowchart illustrating details of a process to be performed in the present exemplary embodiment.

Using FIGS. 2A to 2C and FIG. 4, the process of the present exemplary embodiment will be described in detail, by taking, as an example, the state where the virtual objects 201 and 202 are arranged.

In step S801, the virtual object rendering unit 104 reads data of the virtual objects 201 and 202 from the virtual object database 101.

In step S802, the position and orientation acquisition unit 108 acquires an image of the real space captured by the image capturing unit 107. Further, in step S803, the position and orientation acquisition unit 108 calculates the position and orientation information of each of the virtual objects 201 and 202 as well as the image capturing unit 107 (virtual viewpoint), based on the acquired image. The processes in and after step S802 are suspended until the image of the real space is updated by the image capturing unit 107, and when this update occurs, the processes in subsequent stages are executed. However, the present exemplary embodiment is not limited to performing the processes each time the image is updated by the image capturing unit 107. For example, a method for executing the processes when new position and orientation is acquired by the position and orientation acquisition unit 108 may be employed.

In addition, in step S803, the position and orientation acquisition unit 108 sends the position and orientation information to the interference determination unit 103 and the virtual object rendering unit 104.

In step S806, the interference determination unit 103 determines whether intersection exists for each of the polygons forming the virtual objects 201 and 202, by referring to the virtual objects 201 and 202 stored in the virtual object database 101.

FIG. 2B illustrates a state where the virtual objects 201 and 202 interfere with each other, after the marker corresponding to the virtual object 202 is moved by the experiencing person. In the state illustrated in FIG. 2A, i.e., if no intersection exists (No in step S806), the processing proceeds to step S811. In the state illustrated in FIG. 2B, i.e., if intersection exists (Yes in step S806), the processing proceeds to step S809.

In step S809, the interference part calculation unit 105 calculates interference part information for the virtual objects 201 and 202.

For example, in the present exemplary embodiment, as illustrated in FIG. 2B, assume that the virtual object 202 having the column shape is moved to interfere with the virtual object 201 having the rectangular parallelepiped shape. Then, the interference part 203, which is a set of lines of intersection of polygons, is generated as the interference part information.

In step S810, the interference information holding unit 111 records the data set of the interference information for each combination of the virtual objects 201 and 202. In the present exemplary embodiment, the interference information illustrated in FIG. 8 is recorded. This data set recording is executed each time the image captured by the image capturing unit 107 is updated. In other words, the interference information illustrated in FIG. 8 is assumed to represent, in addition to the data set of the combination of the virtual objects 201 and 202, an accumulation of the data sets, which are each added each time the image captured by the image capturing unit 107 is updated. The process in step S810 will be described in detail below.

In step S811, the virtual object rendering unit 104 renders the virtual objects as well as the interference part, as the image of the virtual space. In the present exemplary embodiment, the virtual objects 201 and 202 are rendered based on the information of the triangular polygons. Further, the interference part 206 is rendered as a line segment having two vertexes based on the interference information. Furthermore, as for the color and the line width of the line segment at the time of rendering, the rendering is performed with reference to the interference information.

FIG. 2C illustrates a result of rendering the virtual objects 201 and 202 as well as the interference part 206. The interference part 206 includes the interference part information accumulated in the past. Therefore, how the virtual object 202 having the column shape is moved can be confirmed after a task.

In step S812, the composition unit 109 combines the image of the real space captured by the image capturing unit 107 with the image of the virtual space, thereby generating a composite image.

In step S813, first, the display unit 110 displays the composite image generated by the composition unit 109, and presents the composite image to the experiencing person wearing the HMD 301. Further, the vibration presentation unit 113 and the sound presentation unit 115 present vibration and sound, respectively, to the experiencing person, according to the information of the interference information notification unit 112.

In step S815, it is determined whether a termination command is transmitted from the experiencing person via an input unit such as a keyboard. If no termination command is transmitted (No in step S815), the processing returns to step S802. If the termination command is transmitted (Yes in step S815), the processing ends.

Figure 5:
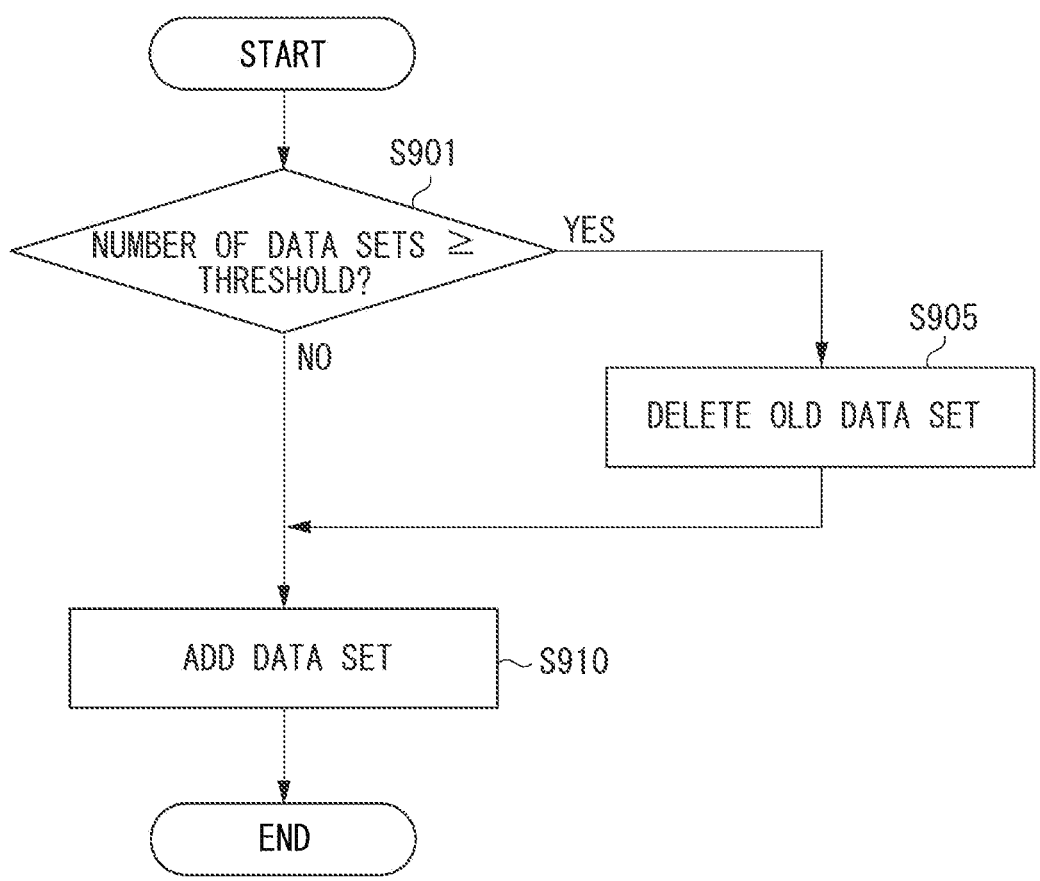
FIG. 5 is a flowchart illustrating details of a process to be performed by an interference information holding unit in the first exemplary embodiment.

FIG. 5 is a flowchart illustrating the details of the process for recording the interference information in step S810.

When the past interference parts are superimposed and displayed as illustrated in FIG. 2C, rendering performance may decrease due to an accumulation of highlights of the interference parts, or it may be difficult to view the interference part due to unnecessary highlight display. In the present exemplary embodiment, such issue is addressed by adopting a method for deleting (erasing) the data sets of the interference part, starting from the oldest one, if the number of the data sets of the interference part is equal to or more than a threshold set beforehand by the experiencing person. This will be described in detail with reference to the flowchart of FIG. 5.

In step S901, the interference information holding unit 111 sums the data sets by referring to the past interference information, and determines whether the total number of the data sets (the past data sets) is equal to or more than the threshold set beforehand by the experiencing person. If the total number of the data sets is equal to or more than the threshold (Yes in step S901), the processing proceeds to step S905. If the total number of the data sets is not equal to or more than the threshold (No in step S901), the processing proceeds to step S910.

In step S905, the interference information holding unit 111 retrieves the oldest data set from the past interference information, and deletes the retrieved oldest data set. The present invention is not limited to the deletion of the oldest data set. The data sets at and before a predetermined time may be all deleted, or the data set having a large number of vertexes may be deleted first.

In step S910, the interference information holding unit 111 adds the current interference information calculated by the interference part calculation unit 105, as a new data set.

Accordingly, it is possible to reconfirm the state of the interference after completing the task, by highlighting the result of the interference between the virtual objects 201 and 202, on the image of the virtual space in the current viewpoint, as the interference part information in the past. Further, the display load can be reduced and the interference part can be easily viewed by providing the threshold for preventing the number of data sets from being equal to or more than a certain number.

The first exemplary embodiment is described above using the example in which the threshold is provided to prevent the number of data sets from being equal to or more than the certain number, and if the number of data sets is equal to or more than the certain number, the data sets are deleted from the memory. However, the data set may be excluded from the displayed image without being deleted from the memory.

The first exemplary embodiment employs the method for representing the interference part 206 by linking the lines of intersection of the polygons, as the method for representing the interference part 206 of the virtual objects 201 and 202. However, the present invention is not limited to representing the interference part by linking the lines of intersection of the polygons interfering with each other, and another method may be adopted to represent the interference part.

Figure 3:
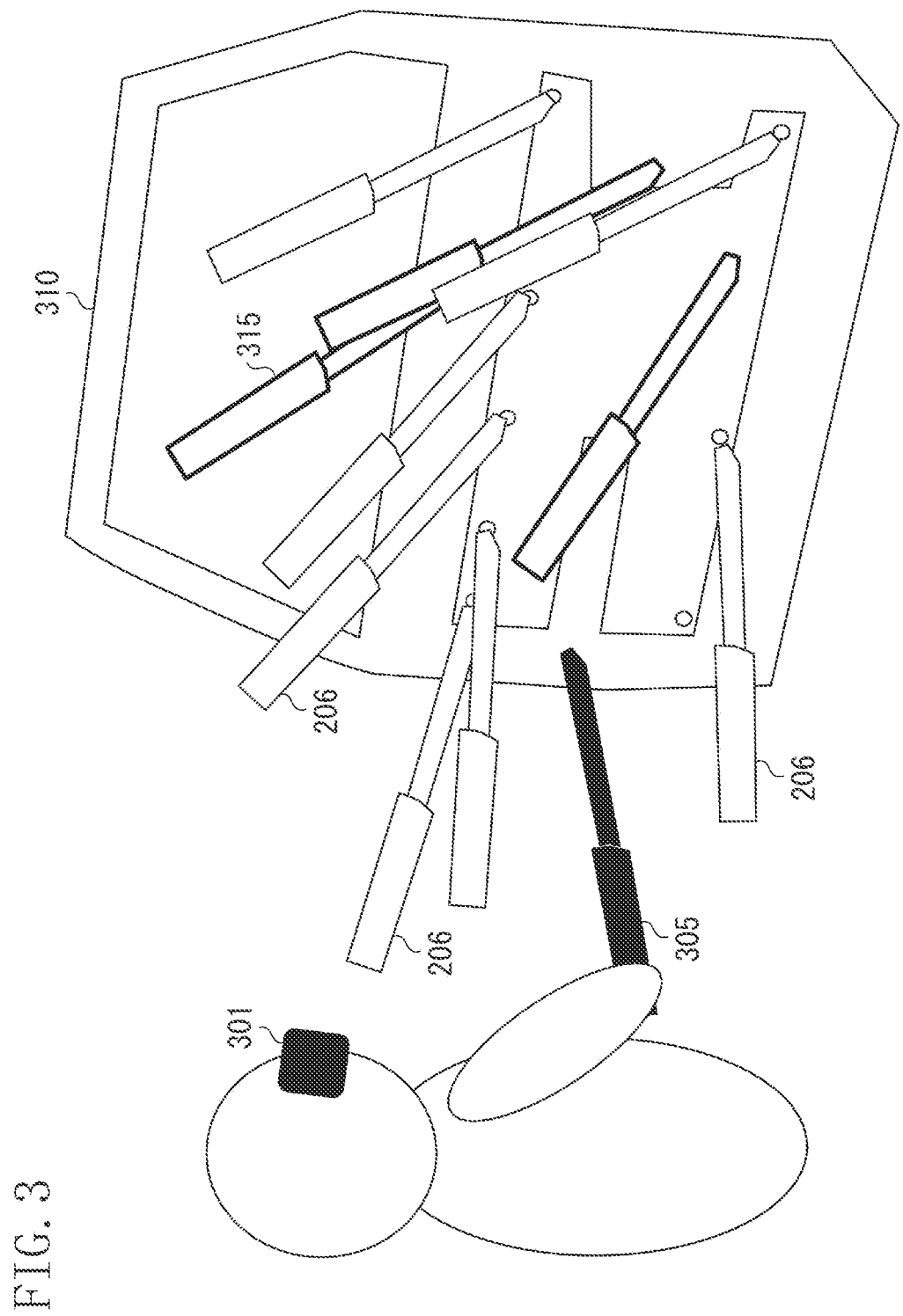
FIG. 3 is a schematic diagram illustrating a method for displaying an interference part in a first modification.

In a present first modification, another method is employed to represent the interference part 206. This method keeps the shape itself of the virtual object at a location where interference has occurred and displaying the shape, as illustrated in FIG. 3. FIG. 3 schematically illustrates work for performing a task of bringing a tool 305 that is a virtual object, close to a door 310 that is another virtual object. The task is performed by the experiencing person wearing the HMD 301.

A configuration for implementing the present modification may be provided by changing the process of the interference information holding unit 111 in the first exemplary embodiment.

In the first exemplary embodiment, the interference information holding unit 111 records the lines of intersection of the polygons interfering with each other, as the vertex positions of the data set of the interference information. However, in the present modification, polygon information indicating the shape of the tool (virtual object) 305 moved by the experiencing person wearing the HMD 301 by hand is recorded as the vertex positions. However, if the data set is recorded each time the image captured by the image capturing unit 107 is updated and all the interference parts 206 are displayed on the door 310, the number of the interference parts 206 is too large, which complicates the display. In the present modification, a method for restricting the display based on a barycentric position in the data set is employed to prevent the display from becoming complicated. This method will be described using a flowchart of FIG. 9.

The present invention is not limited to the triangular polygon with regard to the shape for representing the virtual object. For example, a method for parametrically representing the model data may be employed.

The flowchart of FIG. 9 illustrates details of a process, which corresponds to the process in step S810 in FIG. 4, in the present modification. Only a part different from the first exemplary embodiment will be described below.

In step S925, the interference information holding unit 111 calculates an average of the three-dimensional positions of the vertex positions in the interference information calculated by the interference part calculation unit 105, and calculates the average to be a barycentric position. The barycentric position is associated with the data set and stored.

In step S930, the interference information holding unit 111 performs the following process. The interference information holding unit 111 refers to a barycentric position group associated with the past interference information, and compares the barycentric position group with the barycentric position calculated by the interference information holding unit 111. Based on this comparison, the interference information holding unit 111 determines whether a distance between the barycentric position calculated by the interference information holding unit 111 and at least one of the barycentric positions in the past interference information is equal to or less than a predetermined threshold. If the distance is equal to or less than the threshold (Yes in step S930), the processing ends without adding the data set as the interference information. In other words, when the tool 305 at the current position and orientation interferes with the door 310, the data set is not added if a close barycentric position is present in the past interference information. On the other hand, if the distance is not equal to or less than the threshold (No in step S930), the data set is added as the interference information.

As described above, in the interference display method in the present modification, the confirmation of the interference state after the task can be complemented by replacing the representation of the interference part with easier-to-view representation.

In the above-described first modification, the current interference part information is not added to the data sets if the position where the interference has occurred is close. However, the current interference part information may be added to the data sets, without being included in the image to be displayed.

In the above first modification, if the barycentric position of the virtual object at the time of the occurrence of the interference is close to the interference occurring position in the past interference information, the current interference part information is not added to the data sets. However, the present invention is not limited to determining whether to record the interference information based on the position of the interference part in the space.

In a present second modification, whether to record the interference information is determined according to reliability of the position and orientation output from the position and orientation acquisition unit 108. A process for this determination will be described.

When the position and orientation of the virtual object is determined based on the marker reflected in the captured image, reliability of the position and orientation measuring result decreases in a case where;
(1) the marker appears small on the screen,
(2) a shielding object is present between the image capturing unit 107 and the marker to hide the marker, or
(3) the marker is outside the visual field of the image capturing unit 107, thereby not appearing.

Further, even if the position and orientation of the virtual object is measured by a position and orientation sensor, occurrence of a situation where the reliability decreases is conceivable. Examples of such a situation include a situation where environmental noise is generated, and a situation where the position and orientation falls outside a measuring range.

When the interference information is added in the above-described state where the reliability of the measurement of the position and orientation is reduced, the past interference state cannot be correctly determined at the confirmation after the task. Therefore, a method for not recoding the interference information is performed. This method will be described.

A configuration for implementing the present modification may be provided as follows. Information indicating the reliability of the position and orientation is input into the interference information holding unit 111, from the position and orientation acquisition unit 108 of the above first modification. The interference information holding unit 111 then performs a process for determining whether to record the interference information according to the reliability.

The position and orientation acquisition unit 108 may store the reliability of the current position and orientation measuring result in the process for calculating the position and orientation in step S803 in FIG. 4, for example. The reliability is defined, for example, as 1 if the marker is recognized, 0 if the marker is not recognized, and 0.5 if the ratio of a region occupied by the marker to the captured image is below 10%.

Figure 6:
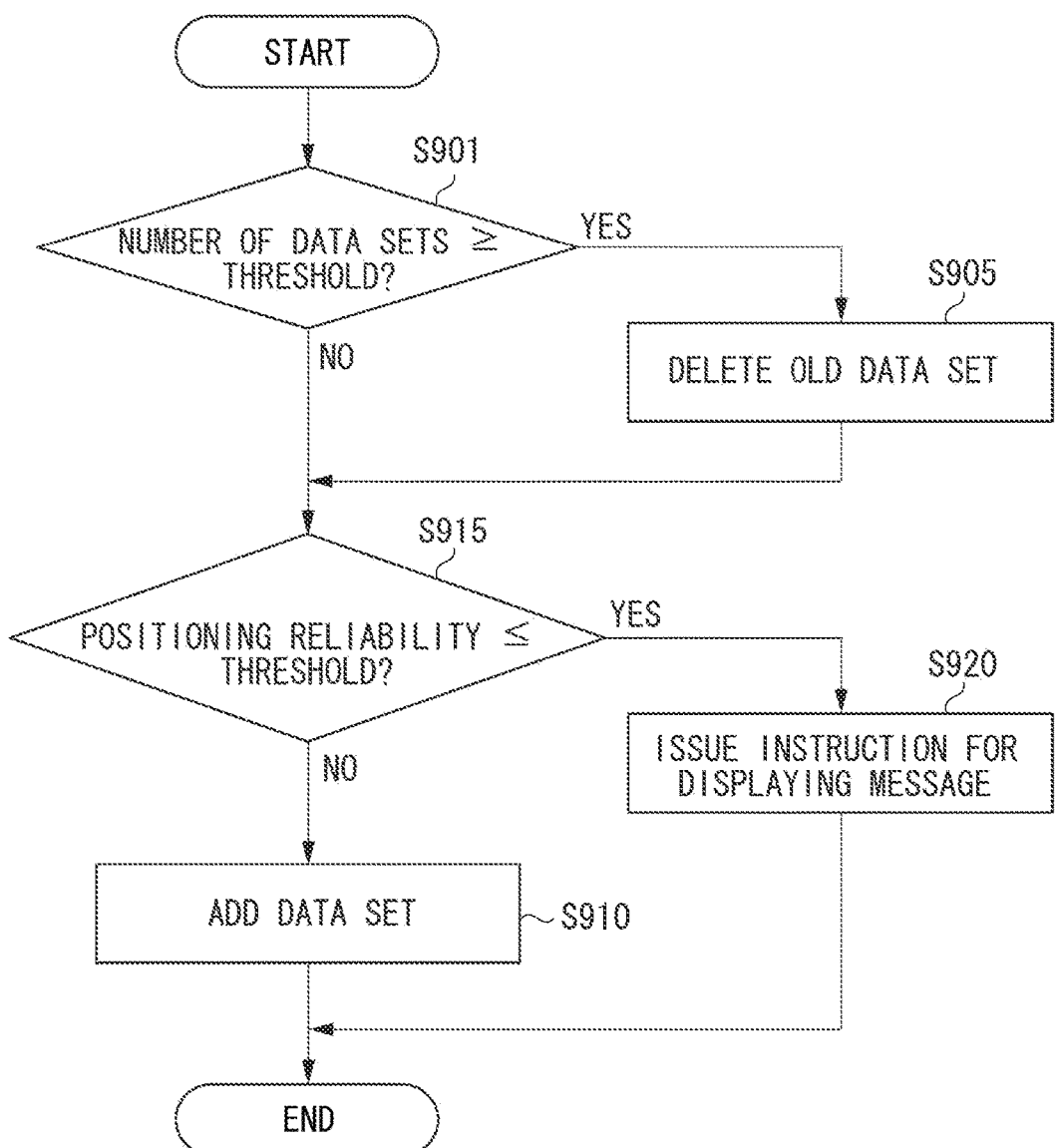
FIG. 6 is a process flowchart of an information processing apparatus in a second modification.

FIG. 6 illustrates details of the process performed by the interference information holding unit 111. The same processes as those in the first modification will not be described.

In step S915, the interference information holding unit 111 acquires (derives) positioning reliability, and determines whether the positioning reliability is equal to or less than a threshold. If the positioning reliability is equal to or less than the threshold (Yes in step S915), the processing proceeds to step S920. If the positioning reliability is not equal to or less than the threshold (No in step S915), the processing proceeds to step S910.

In step S920, the interference information holding unit 111 instructs the virtual object rendering unit 104 to display a message for notifying that the interference information is not recorded because the current positioning reliability is low.

The virtual object rendering unit 104 may display a display message 250 in front of the virtual object image, in the virtual object rendering process in step S811 in FIG. 4. FIG. 10 illustrates a schematic diagram of an image including the display message 250 and displayed by the virtual object rendering unit 104.

As described above, in the interference display method in the present modification, incorrect interference information is removed by not recording the interference part when the reliability at the time of measuring the positioning is low. The confirmation of the interference state after the task can be complemented by such removal.

In the first exemplary embodiment, the virtual objects 201 and 202 are represented by the rectangular parallelepiped shape and the column shape, respectively. Further, the position and orientation of the virtual object is allocated to the position and orientation of the marker, and the experiencing person intentionally moves the virtual object by hand.

However, the present invention is not limited to moving the virtual object by hand, and another method may be employed. The method may measure the position and orientation of the body part of the experiencing person, and allocate this position and orientation to the virtual object.

For example, assume that, in a situation where work is performed using the tool 305 on the door 310 of the first modification, a body part such as an elbow and a knee of the experiencing person is measured by a position and orientation sensor. In this case, interference of not only the tool 305 but also the body part of the experiencing person may be detected during the work and presented.

In a configuration for implementing such a modification, the position and orientation acquisition unit 108 may obtain a position and orientation of a body part such as a knee of the experiencing person, and output the position and orientation to the interference determination unit 103 and the virtual object rendering unit 104. Alternatively, model data corresponding to the shape of the body part of the experiencing person may be recorded beforehand in the virtual object database 101, and output to the interference determination unit 103 and the virtual object rendering unit 104.

As described above, in the present modification, it is possible to confirm not only the interference state of the virtual object intentionally moved by the experiencing person by hand, but also the interference state of the body part unintentionally moved to cause interference during the work.

In the first exemplary embodiment, the vertexes of the line segment representing the past interference part is held as the vertex positions as illustrated in FIG. 8. However, the present invention is not limited to holding the past interference part as the vertex positions. The past interference part may be determined by calculation at the occurrence of the interference.

To implement such a modification, the polygon information as well as the position and orientation of each of the virtual objects 201 and 202 may be added to the interference information in FIG. 8. Further, the end nodes of the lines of intersection of the polygons may be calculated from the data set of the past interference information, each time the image of the virtual space is generated.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132197, filed Jun. 30, 2015, which is hereby incorporated by reference herein in its entirety.

What is claimed is:

1. An information processing apparatus comprising:
   one or more processors; and
   at least one memory device that stores a program executed by the one or more processors in order for the image processing apparatus to function as:
   a storage unit configured to store model data of a plurality of virtual objects;
   a position and orientation acquisition unit configured to acquire a position and orientation of each of the plurality of virtual objects;
   an interference determination unit configured to determine whether interference is present between the virtual objects based on the position and orientation of each of the plurality of virtual objects and the model data of the plurality of virtual objects;
   an interference area recording unit configured to, in response to being determined that the interference is present between the virtual objects, determine a set of lines of intersections between interfered virtual objects as a contour of an interference area on a surface of an interfered virtual object and record the contour of the interference area;
   a repeating unit configured to record contours of the interference area by repeating execution of the interference area recording unit at a predetermined timing;
   a generation unit configured to generate a composite image including a captured image, an image of the plurality of virtual objects, and an image representing the recorded contours of the interference area, after an end of the interference; and
   an output unit configured to output the generated composite image.

2. The information processing apparatus according to claim 1, further comprising a position and orientation measurement unit configured to measure a position and orientation of an image capturing unit producing the captured image,
   wherein the generation unit is configured to generate the image of the virtual objects and the image representing the outline of the interference part, based on the position and orientation of the image capturing unit.

3. The information processing apparatus according to claim 1, wherein the interference part is a line of intersection of the model data when the plurality of virtual objects interfere with each other.

4. The information processing apparatus according to claim 1, further comprising an interference information image generation unit configured to generate an image representing the outline of the interference part.

5. The information processing apparatus according to claim 4, wherein the interference information image generation unit generates an image representing a history of interference in images captured before the captured image, by referring to the interference information recording unit.

6. The information processing apparatus according to claim 5, wherein the interference information image generation unit includes a deletion unit configured to delete past data starting from oldest past data, in a case where a number of pieces of data included in the history of the interference is equal to or more than a threshold.

7. The information processing apparatus according to claim 5, wherein the interference information image generation unit incorporates data into the history of the interference, a distance between a position of the virtual objects in the captured image and a position of the virtual objects in an image captured before the captured image is greater than a threshold.

8. The information processing apparatus according to claim 7, wherein the position is a barycentric position determined by calculating an average of all three-dimensional vertex positions of the model data of the virtual objects.

9. The information processing apparatus according to claim 1, further comprising a derivation unit configured to derive reliability of the position and orientation acquired by the position and orientation acquisition unit,
wherein the interference information recording unit does not record the interference information, in a case where the reliability is equal to or less than a threshold.

10. The information processing apparatus according to claim 1, wherein the interference determination unit further determines whether interference is present between any of the virtual objects and a predetermined part of a human body.

11. The information processing apparatus according to claim 1, wherein the interference information recording unit records, as the interference information, at least one of a frame number of an image, a time, identification information of the interfering virtual objects, a shape of the interference part, a three-dimensional position of the interference part, at the time of occurrence of the interference.

12. The information processing apparatus according to claim 1, wherein the output unit outputs the composite image to a head mounted display.

13. A system comprising a head mounted display and an information processing apparatus,
wherein the head mounted display comprises an image capturing unit configured to capture an image of a real space, and
wherein the information processing apparatus comprises, one or more processors; and
at least one memory that stores a program executed by the one or more processors in order for the image processing apparatus to function as:
a storage unit configured to store model data of a plurality of virtual objects;
a position and orientation acquisition unit configured to acquire a position and orientation of each of the plurality of virtual objects;
an interference determination unit configured to determine whether interference is present between the virtual objects based on the position and orientation of each of the plurality of virtual objects and the model data of the plurality of virtual objects;
an interference area recording unit configured to, in response to being determined that the interference is present between the virtual objects, determine a set of lines of intersections between interfered virtual objects as a contour of an interference area on a surface of an interfered virtual object and record the contour of the interference area;
a repeating unit to record contours of the interference area by repeating execution of the interference area recording unit at a predetermined timing;
a generation unit configured to generate a composite image including the captured image captured by the image capturing unit, an image of the plurality of virtual objects, and an image representing the contours of the recorded interference area, after an end of the interference; and
an output unit configured to output the generated composite image to the head mounted display.

14. An information processing method comprising:
acquiring a captured image of a real space;
acquiring a position and orientation of each of a plurality of virtual objects;
determining whether interference is present between the virtual objects based on the position and orientation of each of the plurality of virtual objects and model data of the plurality of virtual objects;
recording a contour of an interference area, in response to being determined that the interference is present between the virtual objects, determine a set of lines of intersections between interfered virtual objects as a contour of an interference area on a surface of an interfered virtual object at a predetermined timing;
recording contours of the interference area by repeating the recording a contour of an interference area at a predetermined timing;
generating a composite image including the captured image, an image of the plurality of virtual objects, and an image representing the recorded contours of the interference area, after an end of the interference; and
outputting the generated composite image.

15. A non-transitory computer-readable storage medium storing a program for causing a computer to perform a method for controlling an information processing apparatus, the information processing method comprising:
acquiring a captured image of a real space;
acquiring a position and orientation of each of a plurality of virtual objects;
determining whether interference is present between the virtual objects based on the position and orientation of each of the plurality of virtual objects and model data of the plurality of virtual objects;
recording a contour of an interference area, in response to being determined that the interference is present between the virtual objects, determine a set of lines of intersections between interfered virtual objects as a contour of an interference area on a surface of an interfered virtual object;

recording contours of the interference area by repeating the recording a contour of an interference area at a predetermined timing;

generating a composite image including the captured image, an image of the plurality of virtual objects, and an image representing the recorded contours of the interference area, after an end of the interference; and outputting the generated composite image.

\* \* \* \* \*